US011911925B2

(12) United States Patent
Hartmann et al.

(10) Patent No.: US 11,911,925 B2
(45) Date of Patent: Feb. 27, 2024

(54) METHOD FOR AUTOMATICALLY ADJUSTING THE CUTTING GAP OF A SLICING MACHINE AND SLICING MACHINE SUITABLE THEREFOR

(71) Applicant: MULTIVAC SEPP HAGGENMUELLER SE & CO. KG, Wolfertschwenden (DE)

(72) Inventors: Albert Hartmann, Dietmannsried (DE); Alexander Kast, Memmingen (DE)

(73) Assignee: Multivac Sepp Haggenmueller SE & Co. KG, Wolfertschwenden (DE)

( * ) Notice: Subject to any disclaimer, the term of this patent is extended or adjusted under 35 U.S.C. 154(b) by 160 days.

(21) Appl. No.: 17/381,352

(22) Filed: Jul. 21, 2021

(65) Prior Publication Data

US 2022/0024064 A1 Jan. 27, 2022

(30) Foreign Application Priority Data

Jul. 21, 2020 (DE) ......................... 102020119226.6

(51) Int. Cl.
*B26D 7/26* (2006.01)
*B26D 1/28* (2006.01)

(52) U.S. Cl.
CPC ............. *B26D 7/2628* (2013.01); *B26D 1/28* (2013.01); *B26D 2210/02* (2013.01)

(58) Field of Classification Search
CPC .... B26D 1/28; B26D 7/2628; B26D 2210/02; B26D 7/26

(Continued)

(56) References Cited

U.S. PATENT DOCUMENTS 6,598,506 B2 7/2003 Gaemmerler et al.
7,971,510 B2 7/2011 Weber
(Continued)

FOREIGN PATENT DOCUMENTS

DE 103 33 661 A1 2/2005
DE 102013218158 A1 * 3/2015 ........... B26D 7/2635
(Continued)

OTHER PUBLICATIONS

Translation of EP-2599598 (Year: 2023).*
(Continued)

*Primary Examiner* — Nhat Chieu Q Do
(74) *Attorney, Agent, or Firm* — Brooks Kushman P.C.

(57) ABSTRACT

A method is provided for automatically adjusting a cutting gap of a slicing machine for slicing strand-shaped product calibers from a food product into slices, wherein the slicing machine includes a blade motor for driving a blade about a blade axis, wherein the blade has a peripheral cutting edge which defines a blade plane, and a cutting frame with a counter edge for cooperation with the cutting edge. Under control by a controller and without contact of the blade to the food product to be cut, the method comprises: a) moving the blade along the blade axis in an approach direction to approach the cutting frame until contact with the cutting frame, b) stopping the approach movement of the blade, and c) moving the blade back in a spacing direction by a distance corresponding to a desired size of the cutting gap, measured in a direction of the blade axis.

20 Claims, 13 Drawing Sheets

(58) Field of Classification Search
USPC .............................................................. 83/13
See application file for complete search history.

(56) References Cited

U.S. PATENT DOCUMENTS

| | | | | |
|---|---|---|---|---|
| 10,710,259 | B2 * | 7/2020 | Völkl | B26D 1/0006 |
| 2007/0028742 | A1 * | 2/2007 | Mueller | B26D 7/2635<br>83/676 |
| 2007/0295180 | A1 | 12/2007 | Schmeiser et al. | |
| 2011/0247466 | A1 * | 10/2011 | Weber | B26D 7/2635<br>83/13 |
| 2012/0060659 | A1 * | 3/2012 | Weber | B26D 5/02<br>83/72 |
| 2013/0068076 | A1 | 3/2013 | Schmeiser et al. | |
| 2018/0345519 | A1 * | 12/2018 | Völkl | A22C 17/002 |

FOREIGN PATENT DOCUMENTS

| | | | | |
|---|---|---|---|---|
| EP | 1 177 866 | A2 | 2/2002 | |
| EP | 1 409 210 | B1 | 7/2005 | |
| EP | 2599598 | A2 * | 6/2013 | B26D 1/157 |
| EP | 2 580 033 | B1 | 3/2016 | |
| WO | 2005/009696 | A1 | 2/2005 | |
| WO | 2006/005570 | A1 | 1/2006 | |

OTHER PUBLICATIONS

Translation of DE-102013218158 (Year: 2023).*
European Search Report (with English Machine Translation), dated Dec. 3, 2021, Application No. 21182748.0-1016, Applicant Multivac Sepp Haggenmueller SE & Co. KG. 10 Pages.
German Search Report dated May 27, 2021, Application No. 10 2020 119 226.6, Applicant Multivac Sepp Haggenmueller SE & Co. KG, 6 Pages.

* cited by examiner

METHOD FOR AUTOMATICALLY ADJUSTING THE CUTTING GAP OF A SLICING MACHINE AND SLICING MACHINE SUITABLE THEREFOR

CROSS-REFERENCE TO RELATED APPLICATION

This application claims priority to German Patent Application No. DE 102020119226.6 filed on Jul. 21, 2020, the disclosure of which is incorporated in its entirety by reference herein.

TECHNICAL FIELD

The invention relates to slicing machines for slicing strand-shaped food products, so-called calibers, into slices, in particular high-speed slicing machines such as slicers, which are used primarily for slicing calibers of sausage or cheese.

BACKGROUND

The always correct, automatic adjustment of the cutting gap, i.e., the distance between the blade plane in which the cutting edge of the blade rotates and a counter edge, especially measured in the direction of the axis of rotation of the blade, is essential both for the cutting result and the durability of the blade.

If the cutting gap is too large, the slice is increasingly chopped off instead of cut and results in visually unappealing slices; if there is no cutting gap, i.e., if the blade scrapes the counter edge, the blade becomes blunt more quickly.

If possible, the automatic adjustment of the cutting gap should be possible while the blade is rotating, so that the very fast-running blade does not have to be completely stopped in its rotation each time for this purpose.

Another reason for this is that when the blade approaches the cutting frame, e.g., a cutting frame on which the counter edge is formed, the initial contact does not necessarily have to be between the cutting edge and the counter edge, but also between areas of the blade lying away from it on the one hand and/or the cutting frame on the other.

For cutting gap adjustment, it is known to bring the blade, which is initially still spaced from the counter edge, closer to the cutting edge by means of an adjustment device in the direction of the blade axis, the axial direction, and to detect the contact and use it as the starting position or reference position for the subsequent axial spacing of the blade from the cutting edge to a predetermined target cutting gap.

In this context, it is known from EP 1409210 B1 to measure the current consumption of the electric motor of the adjustment device and to conclude that contacting has occurred in the event of an increase. This is done with the blade stationary and not rotating.

However, due to the usually high transmission ratio of the electric motor for the adjustment device, such an increase only occurs at relatively high forces acting transversely on the blade through the caliber support transverse to its blade plane.

From EP 2580033 B1 it is known to measure the tracking error of the blade motor setting the blade in rotation during slitting and to interpret its increase as contact between blade and cutting frame.

However, this requires a motor control that outputs the contouring error. This is the case with a contouring error control of the blade motor, which has the disadvantage, however, that if an impermissibly high contouring error is detected, the actual speed must not only be increased by increased current supply until the desired speed is reached—which would merely cause the impermissibly high contouring error to remain constant—but the actual speed must be increased above the desired speed in order to completely eliminate the contouring error or to reduce it to a permissible, lower value.

This can result in undesirably high actual speeds and a less than optimal cutting result.

In both cases, contamination adhering to the cutting edge of the blade or the counter edge can completely falsify the measurement result, especially in the former procedure with a non-rotating blade.

SUMMARY

It is therefore the object according to the invention to provide a method for cutting gap adjustment as well as a slicing machine suitable for this purpose, which eliminates these disadvantages.

With regard to the method for the automatic adjustment of the cutting gap, this object is solved by measuring the idling torque, the no-load torque, with which the blade motor drives the blade before the cutting frame is contacted by the blade, i.e., before or during the approach of the rotating blade running idle without contact to the material to be cut, and the approaching movement of the blade is then stopped if an increase of this no-load torque by at least a defined 1st torque difference is detected or a defined absolute torque threshold value is at least reached or exceeded.

Normally, the no-load torque increases because the blade has come into contact with the cutting frame and is braked by it.

This procedure can advantageously be carried out when the blade is rotating, in particular when the speed of the blade is from 50 rpm to 500 rpm, preferably from 50 rpm to 150 rpm.

The blade usually has a maximum radius of 300 mm to 600 mm.

Another advantage is that even very slight contact, i.e., with a low mutual contact force between the blade and the cutting frame, leads to a significant increase in torque, i.e., the pressing against each other can be detected very early.

For this purpose, the blade is moved towards the cutting frame at an approach rate of at most 0.1 mm per blade revolution, preferably at most 0.08 mm per blade revolution, preferably at an approach rate of between 0.1 mm and 0.01 mm, preferably between 0.08 mm and 0.03 mm, in order to be able to stop the approach before excessive forces from the cutting frame act on the blade and distort it.

The approach direction in which the blade is moved toward the cutting frame usually coincides with the direction of the blade axis about which the blade rotates, and also usually coincides with the feed direction in which the caliber is advanced toward the blade plane for slicing, but could also be at an acute angle to one or both of these.

For the purpose of the present invention, it is assumed that the direction of the blade axis is identical to the feed direction.

It is further assumed that the approach direction and the spacing direction are exactly opposite directions.

It is further assumed that the approach direction and/or the spacing direction correspond to the direction of the blade axis and/or the feed direction.

This simplifies the control of the movements of the slicing machine.

As soon as contact has been detected in this way and the approach movement has been stopped, the blade is moved back against the approach direction in the spacing direction by such a distance that corresponds to the desired size of the cutting gap.

In this way, the cutting gap can be adjusted to the desired size very quickly and without any manual effort.

The cutting frame is often a circumferentially closed cutting frame and in many slicers it is movable, at least transversely to its through direction, the feed direction of the caliber.

Therefore, such an automatic adjustment of the cutting gap can be carried out after each adjustment of the cutting frame and/or before cutting a new caliber, but usually the adjustment is only carried out when the blade or the cutting frame has been changed.

This is because such a movement can also cause an undesired movement in the direction of the blade axis or the blade plane and/or an undesired pivoting of the front surface of the cutting frame, and thus a deviation from its parallel position to the blade plane, which should be maintained so that the cutting gap actually set exists between the cutting edge of the blade and the counter edge of the cutting frame.

In order to ensure that the increase in the idle torque was caused by the blade starting at the front surface of the cutting frame, several, in particular at least 3, better at least 5, better at least 10 blade revolutions are preferably carried out after the approach movement has stopped, with the power supply unchanged and the approach movement stopped—i.e., the blade at a standstill in the direction of the blade axis—and it is checked whether the no-load torque remains approximately the same, i.e., does not drop by more than a specified 2nd moment difference.

Such a drop would indicate that the cause of the previous increase in the no-load torque was a contaminant, such as a meat fiber, between the blade and the cutting frame, which was flung away due to the further blade revolutions and no longer brakes the blade.

If such a decrease of the idle torque by at least the 2nd moment difference is not detected, the return movement of the blade in spacing direction is performed as described.

This can also be done completely automatically and thus unmanned.

Preferably, during the infeed of the blade in idle mode for the cutting gap adjustment, the current supply to the blade motor is controlled in dependence on occurring relative changes of the rotation speed of the blade during one blade revolution.

Such variations in rotation speed occur in practice and are caused by uneven friction in the motor bearings or the existing seals around the circumference of, for example, the blade shaft.

If the rotation speed changes within one blade revolution by more than a specified tolerance difference between the lowest and highest occurring rotation speed, the current supply is increased if the rotation speed has dropped to an unacceptable extent, and reduced in the opposite case, in each case until the rotation speed is again within the permissible range.

Alternatively, the current supply can also be controlled during the infeed of the blade in the no-load mode for the cutting gap setting as a function of occurring absolute deviations of the actual rotation speed from a set rotation speed during a complete blade revolution. If a defined tolerance change from the actual rotation speed is exceeded, the power supply is increased if the rotation speed has dropped to an impermissible extent, and reduced in the opposite case, in each case until the rotation speed is again within the permissible range.

Such a so-called speed control of the motor is easier to carry out, since it is less sensitive than, for example, a contouring error control, where, if the rotation of the blade is lagging behind the set condition, the control aims at catching up and compensating for the contouring error, and for this purpose the speed of the blade has to be increased above the intended desired speed, at least for a limited time, but this can have a negative effect on the setting process.

A general problem with the adjustment of the cutting gap by means of previous approach of the blade to the front surface of the cutting frame until contact is made is that with the known methods it cannot be determined, at least automatically, whether the first contact has actually taken place between the cutting edge of the blade and the front surface of the cutting frame at its counter edge or at least close to its counter edge, or far away from it.

Also, on the blade side, contacting may not occur by means of the cutting edge, but by means of an area of the blade away from the cutting edge.

This can occur if the front surface of the blade facing the cutting frame is impermissibly convexly curved or the cutting edge does not lie in a plane or the front surface of the cutting frame facing the blade is impermissibly convexly curved or—which is the more common case—the front surface is flat but does not run parallel to the blade plane in which the cutting edge moves but at a slight angle to it.

In this case, the cutting edge of the blade will reach the front surface of the cutting frame first, but not at or near its counter edge, but far away from it, at the beginning of the intersection of the cutting edge with the front surface—viewed in the axial direction—or at the last point of this intersection.

Then, the subsequent backward movement of the blade results in the setting of a gap between this first point of contact at the front surface and the blade edge, but the actual cutting gap between the counter edge and the blade edge is then actually larger.

To avoid this, according to the invention, it can be automatically checked whether there is sufficient parallelism between the blade plane and the front surface of the cutting frame, in particular the cutting frame.

To this end, a check is made to see whether, for each revolution performed in the no-load mode—when the blade is stopped approaching axially—the no-load torque always increases significantly—i.e., by more than a predetermined torque difference value—at the same rotational position of the blade, which indicates that contact of the blade with the front surface does not take place over its entire area at the same time, but only partially in an area of this front surface.

By determining the rotational position and/or the position of this area, it is also possible to determine the position of the tilt axis about which the front surface of the product guide is inadmissibly pivoted relative to the blade plane, and to output this to the operator for easier readjustment of the cutting frame.

A slicing machine is of the type comprising a blade with a cutting edge driven by a blade motor and rotatable about a blade axis, a cutting frame with a front face along which the blade moves with its cutting edge, and an adjustment device for adjusting the blade in the direction of the blade axis.

In such a slicing machine, the existing object is solved in that the machine comprises a torque sensor with which the torque with which the motor drives the blade or with which the blade rotates can be measured.

According to the invention, the control system (i.e., control or controller) that controls at least all moving parts of the machine must be capable of performing the previously described procedure.

Preferably, the cutting frame, usually a cutting frame surrounding the product caliber, is movably attached to the base frame of the machine.

Thereby, on the one hand, a possibility of movement of the cutting frame transversely to the axial direction is known in order to control the bearing force of the caliber on the cutting frame.

According to the invention, the cutting frame can preferably be moved in such a way that the angular position of its front surface relative to the blade plane can be changed in order to restore this parallel position in the event of a deviation from the desired parallel position.

This is usually done manually by means of appropriate adjustment elements such as adjusting screws.

This makes it possible, instead of replacing the cutting frame, to carry out its read-justment, so that spare parts consumption remains low and machine downtimes can be kept short.

BRIEF DESCRIPTION OF THE DRAWINGS

Embodiments according to the invention are described in more detail below by way of examples. They show in.

DETAILED DESCRIPTION

Figure 1A:
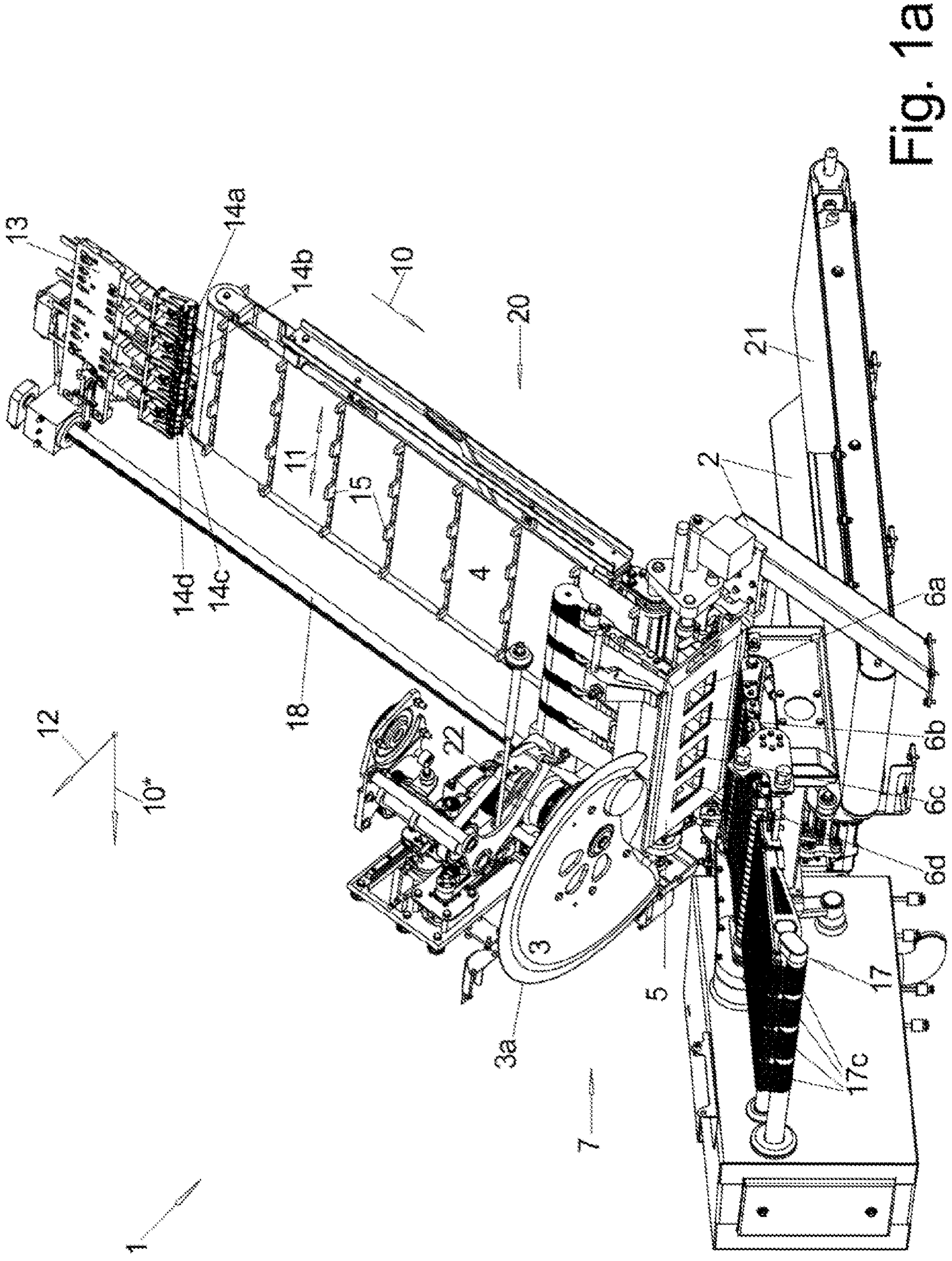
FIG. 1*a*: a slicing machine in the form of a slicer according to the prior art in perspective view.
Figure 2:
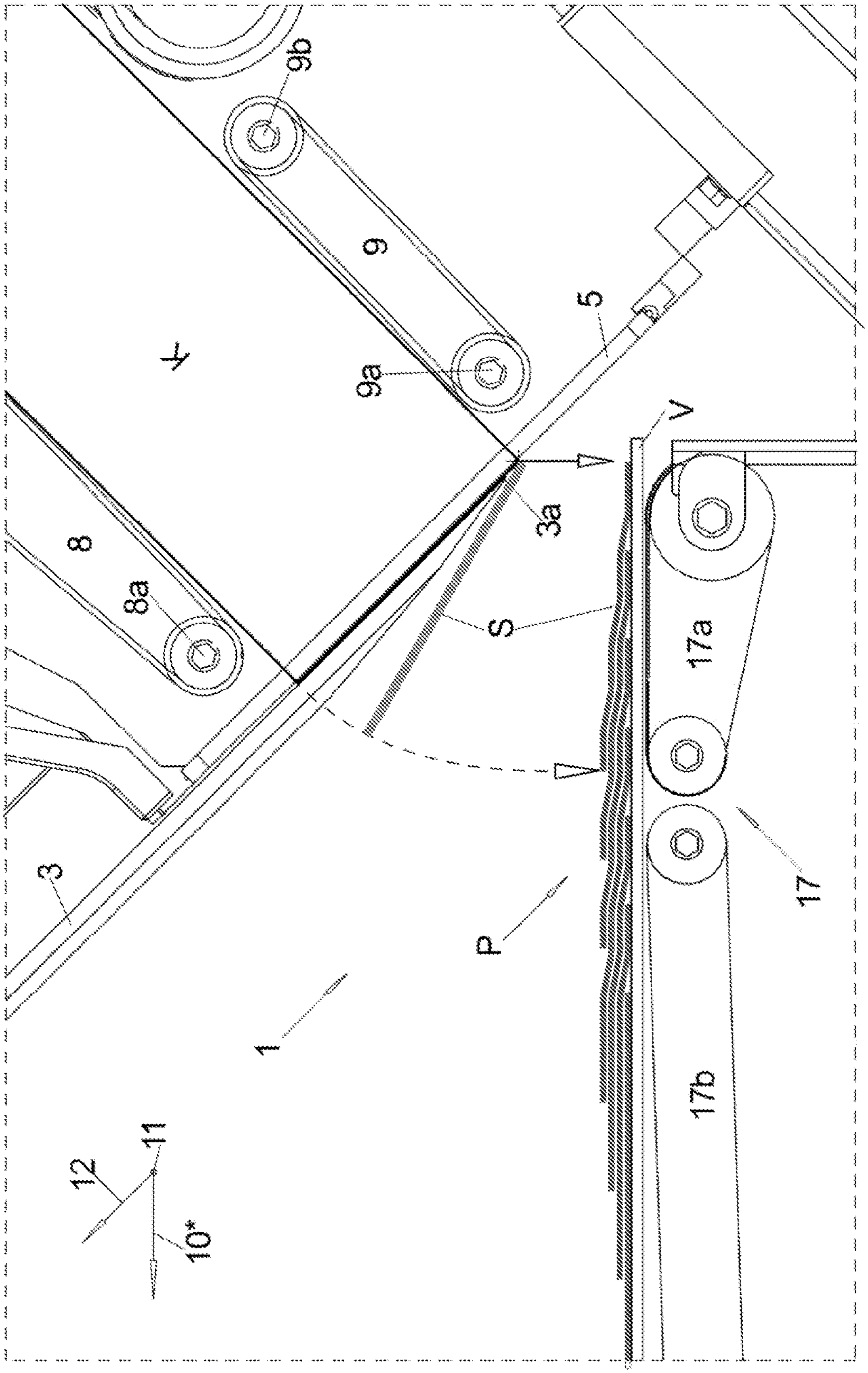
FIG. 2: a side view from the longitudinal section of FIG. 1*c*, but enlarged in comparison, showing the cutting of slices.

FIG. 1*a* shows a perspective view of a slicer 1 for simultaneous slicing of several product calibers K next to each other and, if necessary, depositing the slices S in shingled portions P, each consisting of several slices S—see FIG. 2—with a general horizontal direction of passage 10* of the material to be sliced through the slicer 1 from right to left.

Figure 1B:
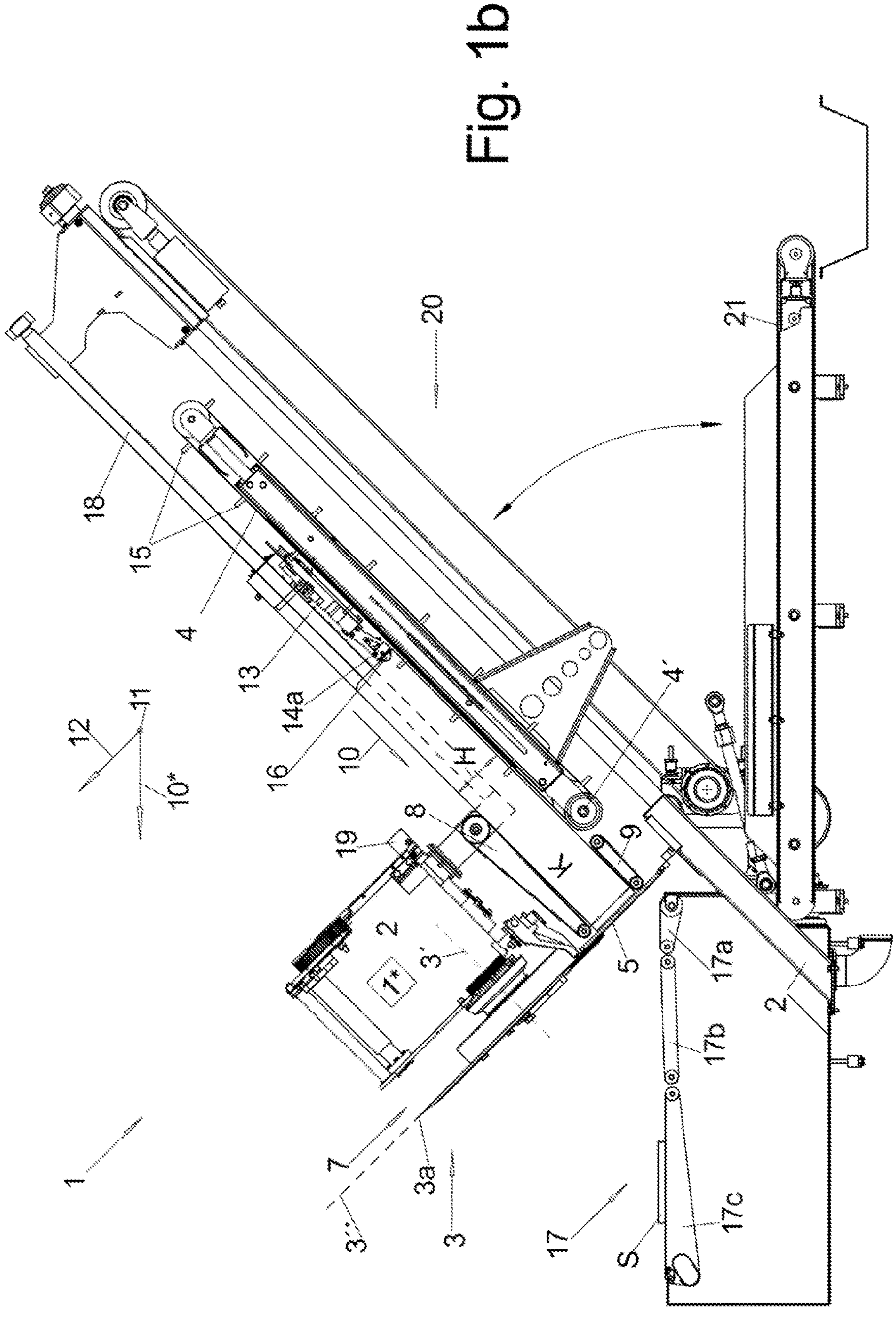
FIG. 1*b*: in side view a simplified vertical longitudinal section through the slicing machine of FIG. 1*a*, in which the various conveyor belts can be seen more clearly, since the cover and cladding parts lying in front of them in the direction of view lie in front of the section plane, with the feed belt pivoted up into the slicing position.

FIG. 1*b* shows a vertical section through such a slicer 1—simplified by omitting details less important for the invention—cut in longitudinal direction 10, the feeding direction of the calibers K to the cutting unit 7 and thus the longitudinal direction of the calibers K lying in the slicer 1, and thus also cut in the general throughput direction 10*.

The basic structure of a slicer 1 according to the state of the art is that a cutting unit 7 with a sickle blade 3 driven in rotation about a blade axis 3' by a blade motor 22 to which several, in this case four, product calibers K (not shown in FIG. 1*a*) lying next to each other transversely to the feeding direction 10 are fed by a feed unit 20, from the front ends of which the rotating sickle blade 3 simultaneously cuts off a slice S from each caliber K.

For this purpose, the feed unit 20 comprises a feed conveyor 4 in the form of an endless, circulating feed belt 4, the calibers K lying side by side thereon in the width of this feed conveyor 4 being positioned in this transverse direction 11 by elevations 15 projecting outwardly from the feed belt 4.

Figure 1C:
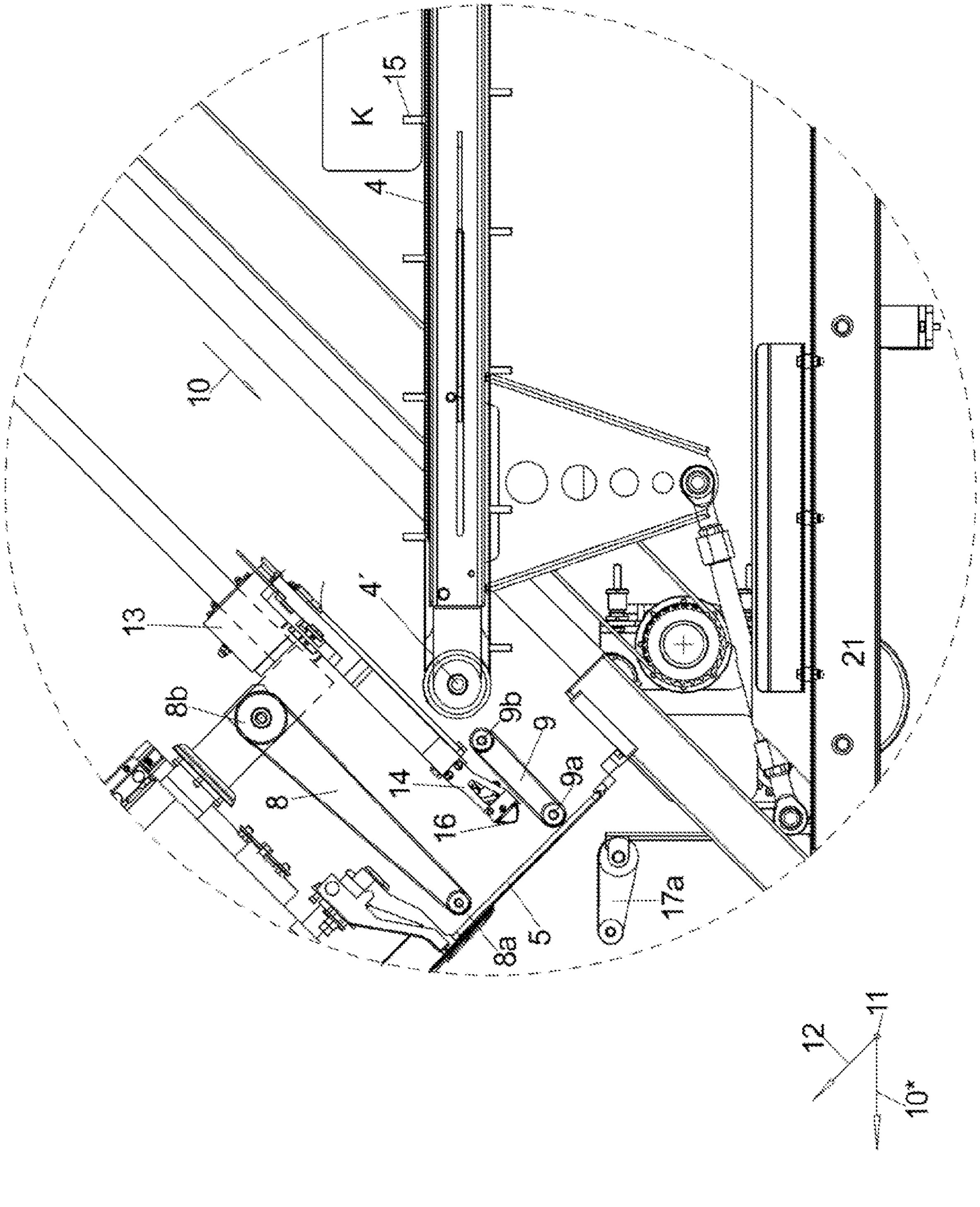
FIG. 1*c*: a detailed enlargement from the longitudinal section of FIG. 1*b*, but with the infeed belt pivoted down into the loading position and the product caliber in an advanced state of slicing.

For the cutting of the product calibers K, the feed conveyor 4 is in the inclined position shown in FIGS. 1*a, b*, with the cutting side front end low and the rear end high—the cutting position—from which it pivots about a pivot axis 4' extending in the first transverse direction 11, which is located in the vicinity of the cutting unit 7, the base frame 2 of the machine into an approximately horizontal loading position shown in FIG. 1*c*, in which new product calibers K are already placed on the feed conveyor 4, while the rest KR of the preceding calibers K are still held on the gripper 14 between the upper and bottom product guides 8, 9 and are ready to be sliced.

The rear end of each caliber K lying in the feed unit 20—see FIG. 1*b*—is held positively by a gripper 14*a*-*d* in each case by means of gripper claws 16. These grippers 14*a*-14*d*, which can be activated and deactivated, are attached to a common gripper unit 13, which can be tracked in a controlled manner along a rod-shaped gripper guide 18 in the feeding direction 10, whereby, however, the specific feeding speed of the calibers K is effected by a so-called upper and bottom product guide 8, 9, which each consist of an endless, circulating guide belt and which engage on the upper side and lower side of the calibers K to be cut at their front end regions near the cutting unit 7, wherein all movable parts of the machine 1 are controlled by its control 1* (i.e., control system or controller).

For slicing, the front ends of the calibers K are each guided through a so-called product opening 6*a*-*d* provided for each caliber, which are formed in a plate-shaped cutting frame 5, the cutting plane 3" running directly in front of the front end face of the cutting frame 5, which faces obliquely downwards, in which cutting plane the sickle blade 3 rotates with its cutting edge 3*a* and thus cuts off the projection of the calibers K from the cutting frame 5 as slices S. The cutting plane 3" runs perpendicular to the upper run of the feed conveyor 4 and/or is defined by the two transverse directions 11, 12.

The upper product guide 8 is displaceable in the second transverse direction 12—which runs perpendicular to the surface of the upper run of the feed conveyor 4 folded up into the cutting position—for adaptation to the height H of the caliber K in this direction, which can be determined by a height sensor 19. Furthermore, at least one of the product guides 8, 9 can be designed to be pivotable about one of its idler pulleys 8*a*, 8*b*, 9*a*, 9*b* in order to be able to change the direction of the run of its conveyor belt resting against the caliber K to a limited extent.

The slices S, which stand at an angle in the space corresponding to the inclined position of the feed unit 20 and cutting plane 3" during separation, fall—see FIG. 2—onto a discharge unit 17, which begins below the cutting frame 5 and runs in the throughput direction 10* and in this case consists of several conveyors 17*a, b, c* arranged one behind the other with their upper runs approximately aligned in the throughput direction 10*, one of which can also be embodied as a weighing unit.

Below the feed unit 20 there is also an approximately horizontally running endpiece conveyor 21, which starts with its front end below the cutting frame 5 and directly below and/or behind the discharge unit 17 and with its upper run transports end-pieces falling thereon from there to the rear against the throughput direction 10*.

For this purpose, at least the first end piece conveyor 17*a* in the throughput direction 10* can be driven with its upper run in the opposite direction to the throughput direction 10*, so that an end piece KR falling thereon, for example, can be transported to the rear and falls onto the lower-lying end piece conveyor 21.

After separation, the slices S are falling either directly onto these conveyors 17*a-c*, as shown in FIG. 1*b*, or, as shown in FIG. 2, onto a packing element V resting thereon, such as a carrier carton or a flat plastic tray.

Figure 3A:
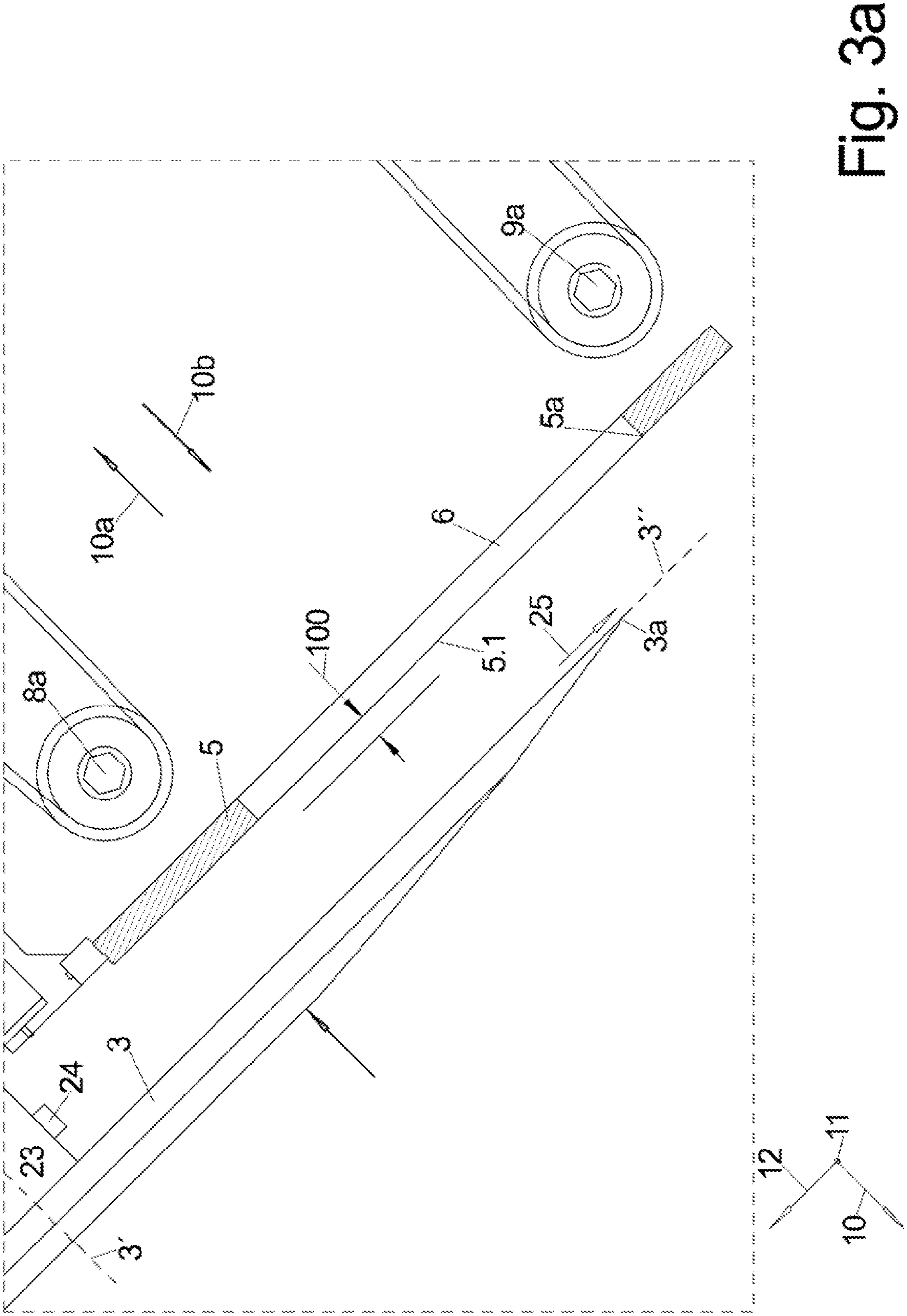
FIGS. 3*a*-*c*: different positions of the blade to the cutting frame in the side view.

When a slice S is cut, the cutting edge 3*a* runs at a small distance, the cutting gap 100 shown in FIG. 3*a*, along the front surface of the cutting frame 5 facing the blade 3, and in doing so sweeps over the entire cross section of the respective frame opening 6, from which the product caliber K—which is not shown in FIG. 3*a* for reasons of clarity—protrudes.

Figure 4A:
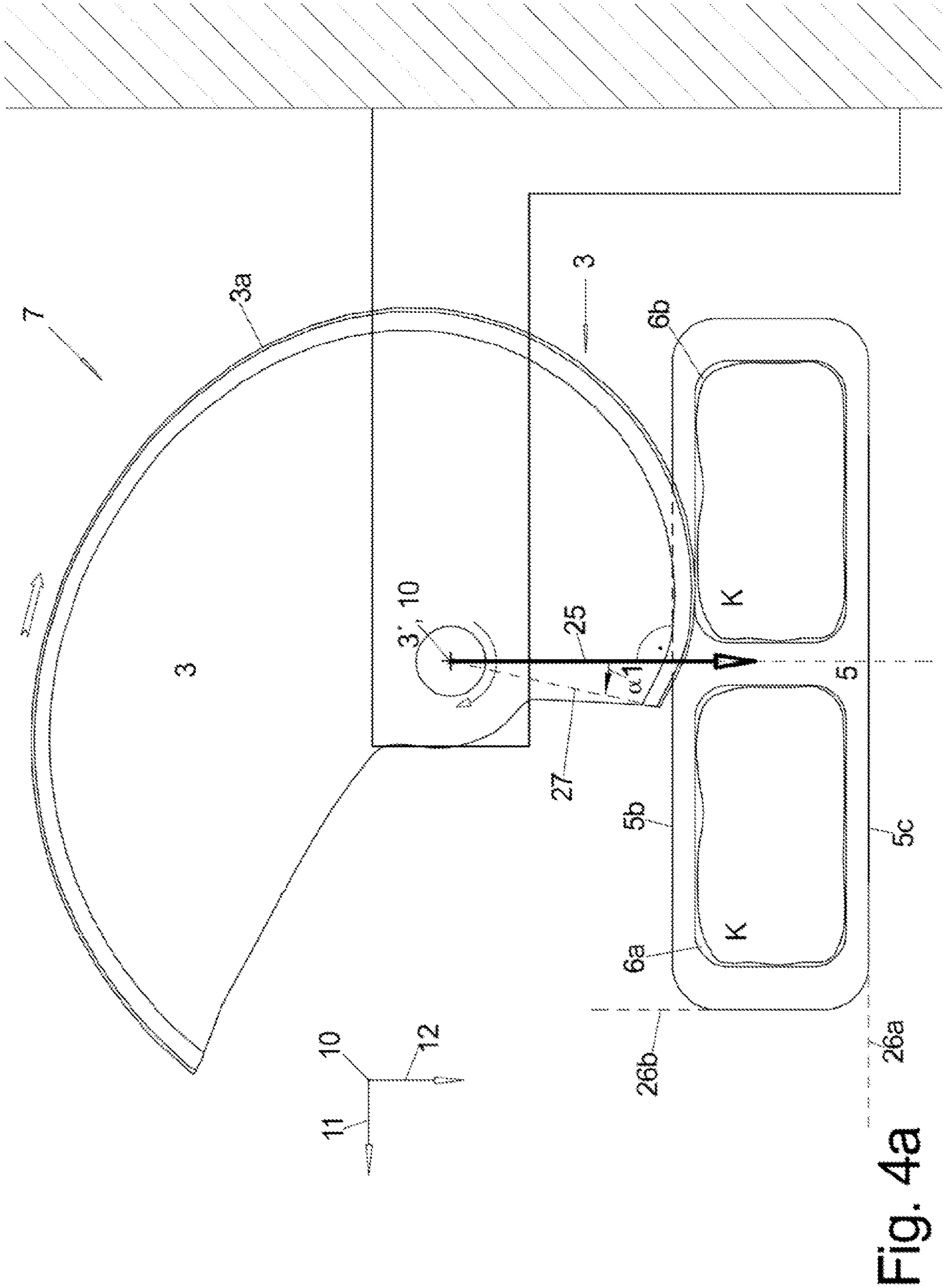
FIGS. 4*a*-*d*: different rotational positions of the blade to the cutting frame viewed in the axial direction.
Figure 4B:
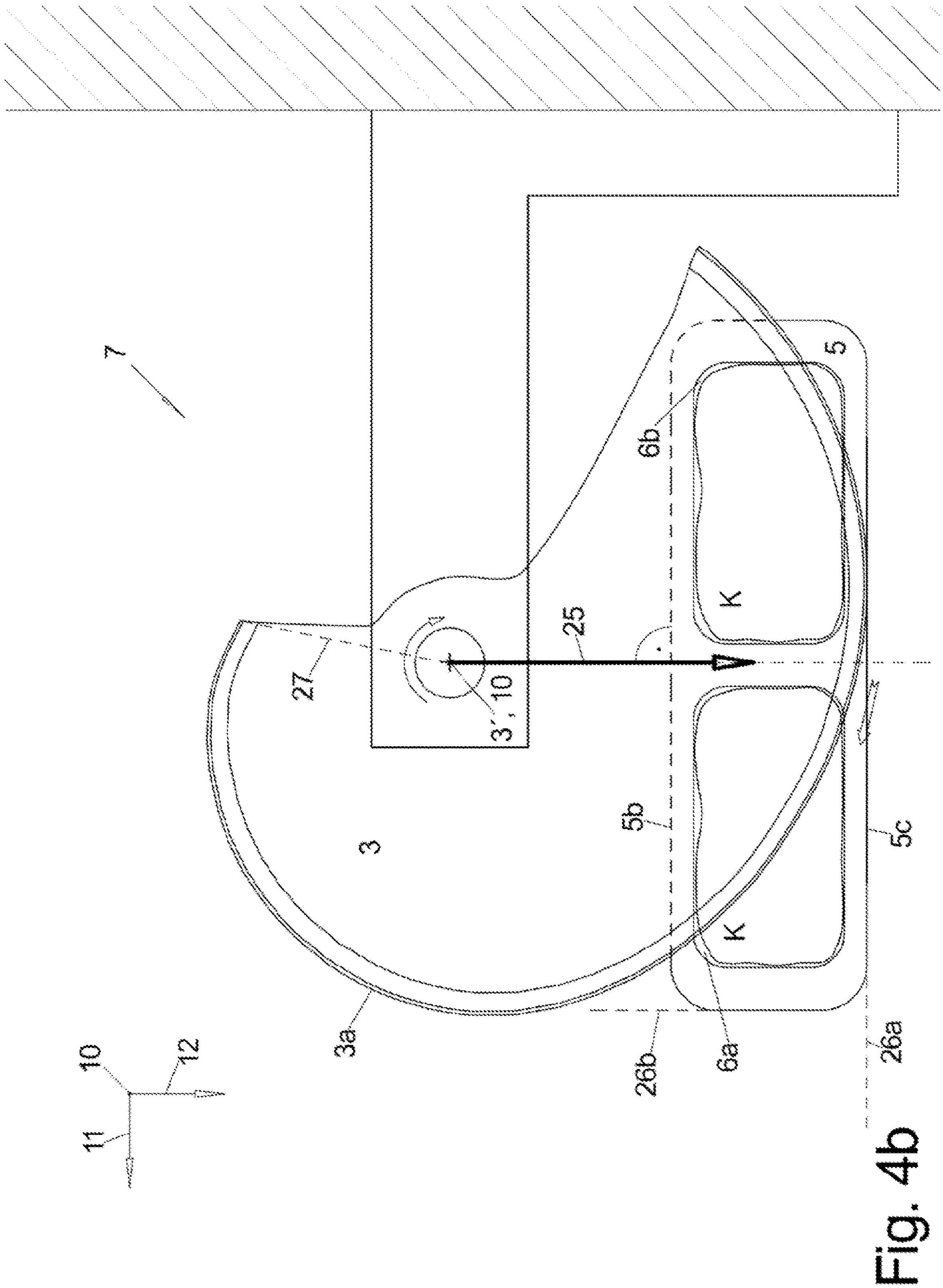
Figure 4C:
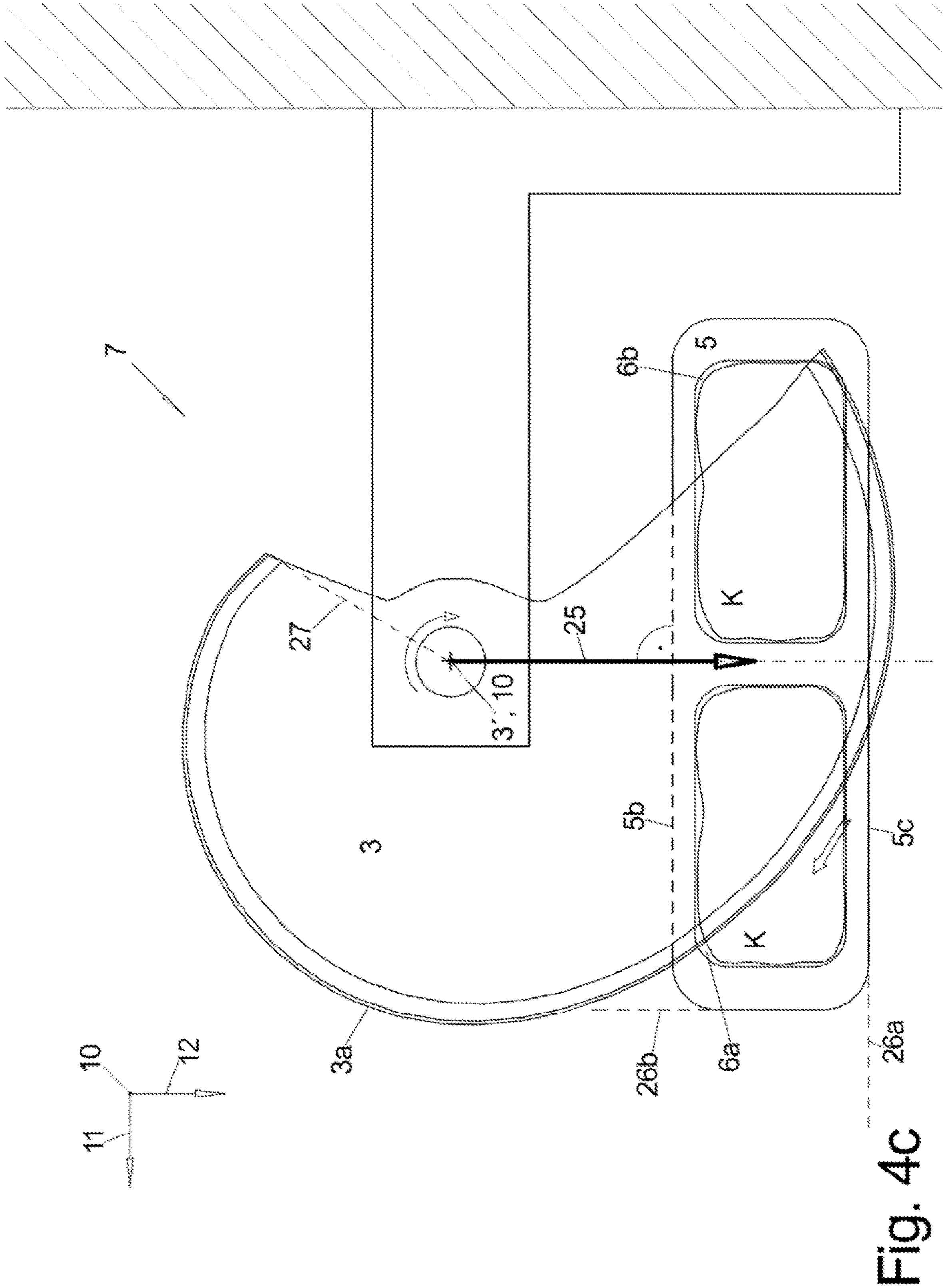

The cutting edge 3*a* advances in the direction of immersion 25 from the upper edge 5*b* of the front surface 5.1 of the cutting frame 5 further and further along the front surface 5.1, whereby, viewed in the axial direction 10 according to FIGS. 4*a* to *c*, the direction of immersion 25 is defined as a radial axis from the blade axis 3' at right angles towards the upper edge 5*b* of the cutting frame 5.

In this case, the circumferential edge of the product opening 6 on the front side of the cutting frame 5 acts as a counter edge 5*a* for the cutting edge 3*a*, at least over part of the circumference of the product opening 6.

The cutting gap 100 is necessary, above all, so that the blade 3 with its cutting edge 3*a* does not slide along the front surface of the cutting frame 5 with every cut, since this would, on the one hand, cause the cutting edge 3*a* to become blunt very quickly and, on the other hand, damage the front surface and, in particular, the counter edge 5*a* of the cutting frame 5.

On the other hand, too large a cutting gap 100 prevents the counter edge 5*a* from having sufficient effect on the cutting edge 3*a* and worsens the cutting result.

For this reason, the cutting gap 100 is often controlled by readjustment, in that the—preferably rotating—blade 3 according to FIG. 3*a* is moved closer and closer to the cutting frame 5 in the approach direction 10*a*, which is parallel to the blade axis 3', by means of an adjustment device 23—without there being a product caliber in it for cutting—until the blade 3 makes contact with the front surface of the cutting frame 5, which is indicated to the control 1* of the machine by the fact that a parameter automatically monitored in this respect, for example the no-load torque ML of the blade 3 or of the blade motor 22 driving it, increases.

Figure 5A:
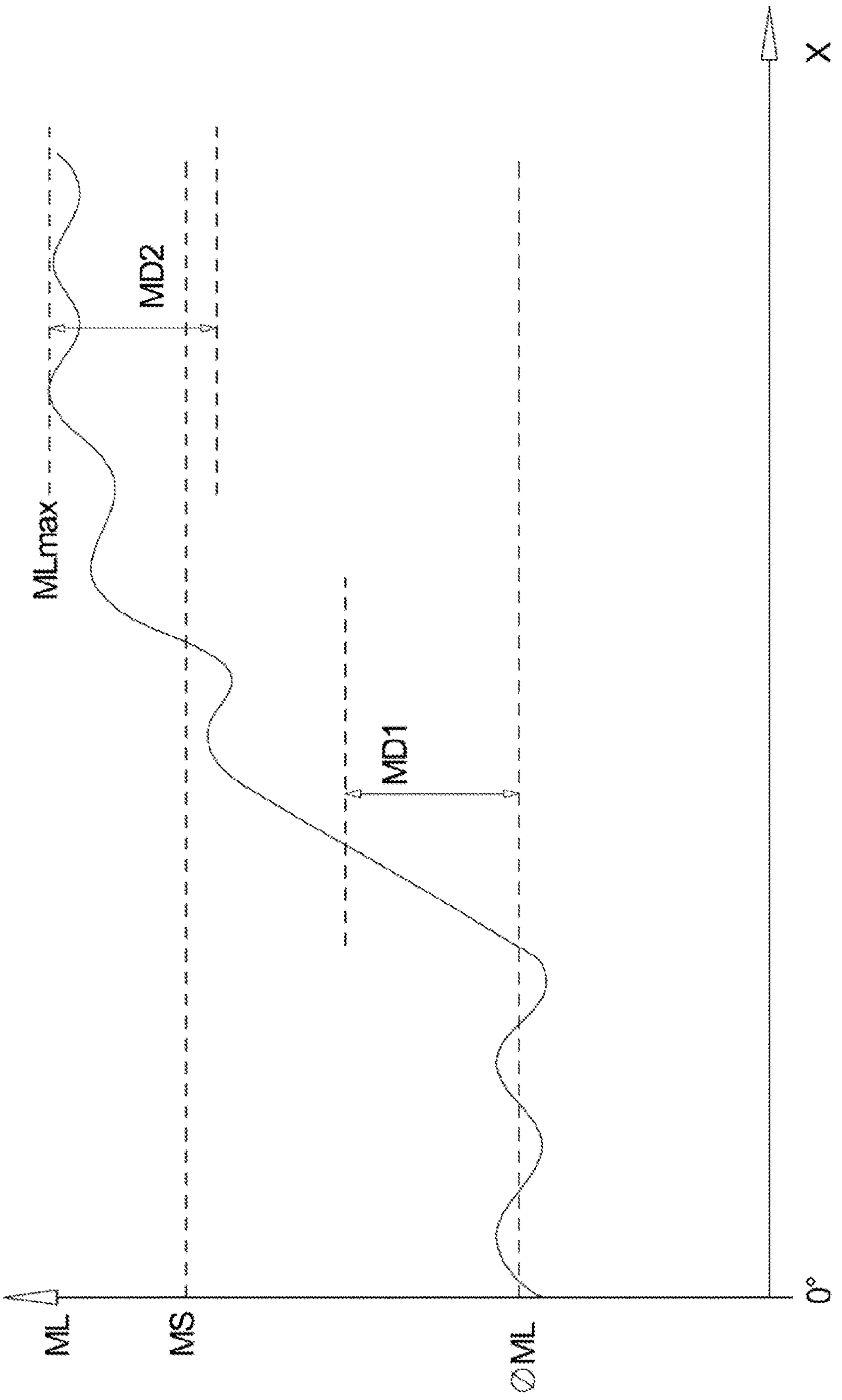
FIG. 5*a*: a torque diagram.

As shown in FIG. 5*a*, the no-load torque ML, which always varies slightly, even during one revolution of the blade 3, will increase from a pre-contact average no-load torque ØML. If this is a relative increase by a 1st moment difference MD1 or an absolute increase above an absolutely defined moment threshold MS, the control 1* interprets this as contact between blade 3 and cutting frame 5 and stops the approach movement in approach direction 10*a*.

After this, a specified number of further revolutions of the blade are performed and a check is made to see whether there is again a sharp drop of more than a 2nd moment difference MD2 from the maximum achieved no-load torque MLmax. If this is not the case, the increase was also not caused by a particle, such as a meat fiber, getting between the blade 3 and the cutting frame 5, which was then flung away again, but by direct contact of the blade 3 with the cutting frame 5.

Then the blade 3 is moved axially back again in spacing direction 10*b* by a distance corresponding to the desired cutting gap 100.

From this contacting axial position, the control 1* causes the blade 3 to move back in spacing direction 10*b* by the distance of the desired cutting gap 100.

As long as the blade plane 3" defined by the cutting edge 3*a* is parallel to the front surface 5.1 of the cutting frame 5, the cutting gap 100 set in this way is uniformly maintained during the entire cutting movement of the blade 3—in which there is an overlap of blade 3 and cutting frame 5 as viewed in the axial direction 10.

However, if these two surfaces are not parallel to each other—i.e., if they are at an angle to each other by more than a tolerance angle to be specified—it is not possible to set a cutting gap 100 that remains constant throughout the cutting movement, and a warning signal should be emitted by the control so that the operator first re-establishes the parallelism of the cutting plane 3" to the front surface 5.1 of the cutting frame 5.

As a rule, the course of the blade axis 3' is not adjustable and the blade 3 is flat in that its cutting edge 3*a* defines a blade plane 3".

Thus, only the front surface 5.1 of the cutting frame 5 can be adjusted in its position. In case of lack of parallelism, this front surface 5.1 is at a difference angle β about an inclination axis 26 oblique to the blade plane 3" which should be eliminated or at least minimized.

Figure 3B:
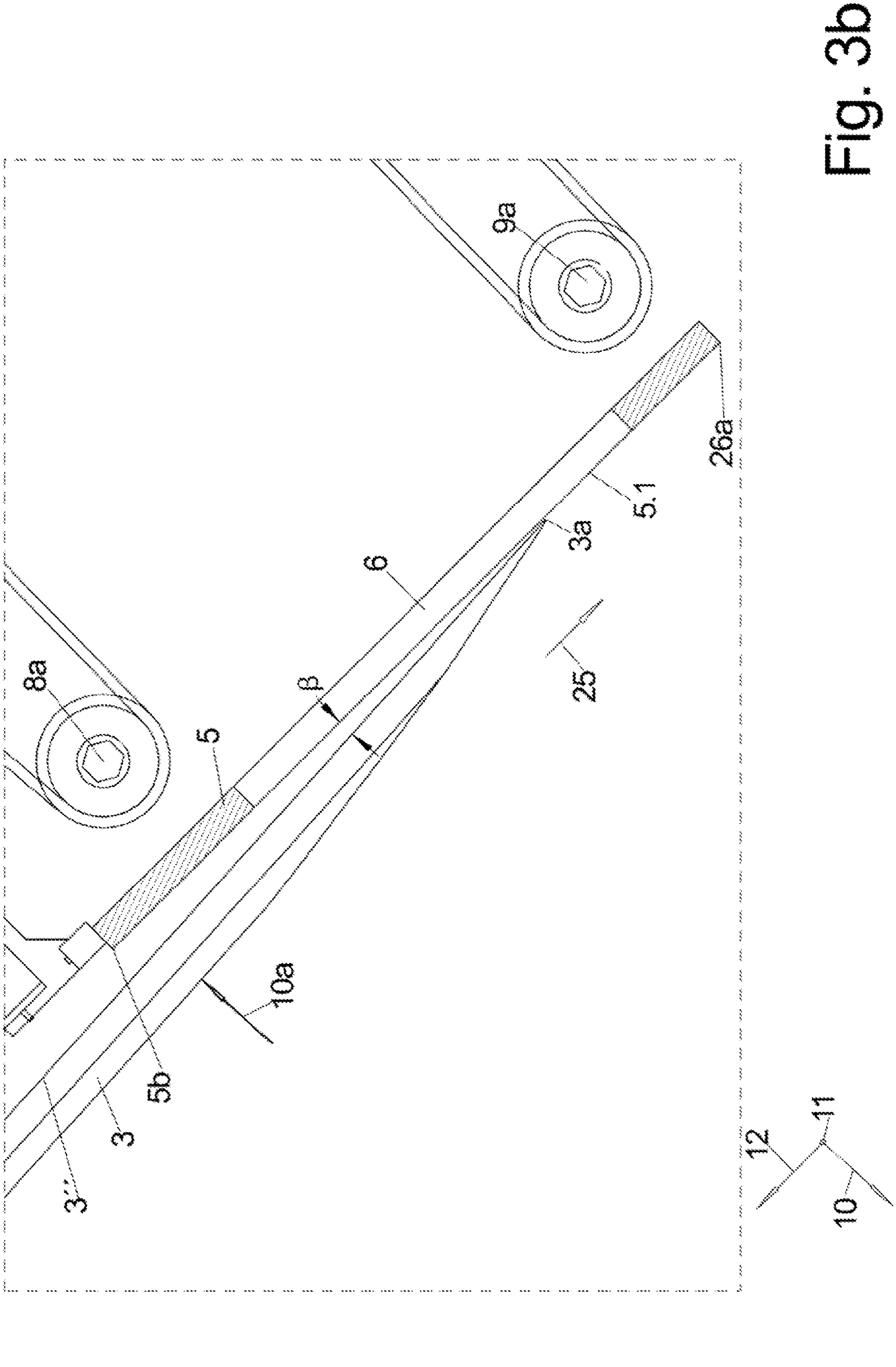

If the 1. transverse direction 11, the width direction of the slicer 1, is the oblique position axis 26*a*—i.e., lies transverse to the direction of immersion 25 of the blade 3—and the upper edge 5*b* of the front surface 5.1 adjacent to the cutting axis 3' is further away from the cutting plane 3" than the lower edge 5*c* facing away from the cutting axis 3', the situation shown in FIG. 3*b* results:

When the blade 3 approaches axially in the approach direction 10*a*, the rapidly rotating blade 3 will be the first to reach the front surface 5.1 with its cutting edge 3*a* at or near its lower edge 5*c*—as shown in FIG. 4*b*—and when it is pressed on further by means of the adjustment device 23, the monitored no-load torque ML will increase, but due to the pliability of the blade 3 much more slowly than when the blade 3 is applied to the front surface 5. 1 simultaneously over their entire overlap area, which can make it difficult for an evaluation unit of the control 1* to detect contact between the blade and the cutting frame 5 in good time.

Figure 3C:
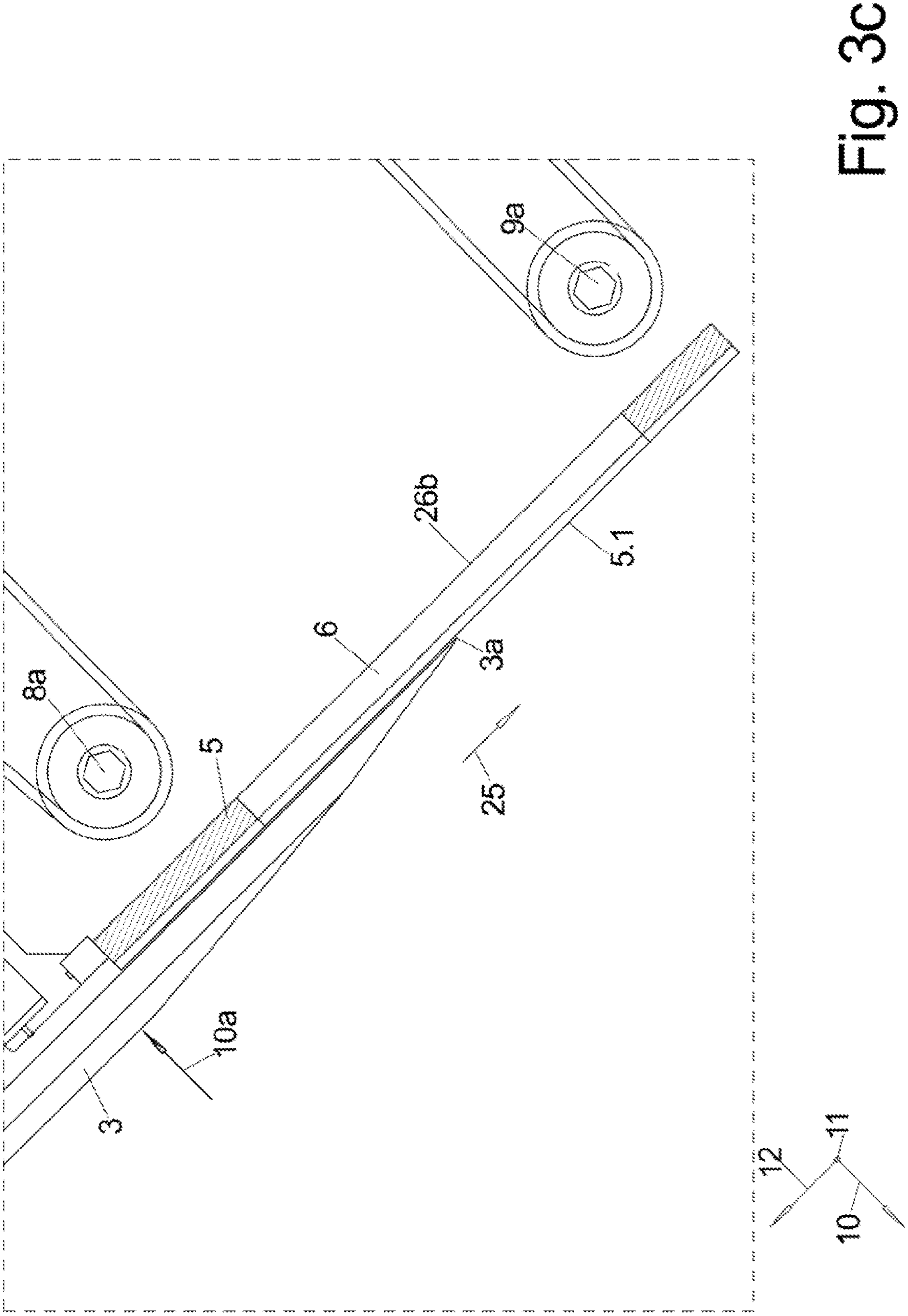

If, on the other hand, as shown in FIG. 3*c*, the axis of inclination 26*b* is the second transverse direction 12, i.e., parallel to the immersion direction 25, then when the rotating blade 3 approaches axially in the approach direction 10*a*, the blade 3 reaches the front side 5.1 of the cutting frame 5 for the first time with its cutting edge 3*a* either at the left or at the right end of the cutting frame 5, measured transversely to the immersion direction 25, i.e., in the 1. transverse direction 11, thus shortly after the rotational position shown in FIG. 4*a* or shortly before the rotational position shown in FIG. 4*b*, which in both cases leads to the fact that during the sliding along the product opening 6 or the several product openings 6*a, b* by the cutting edge 3*a* the cutting gap 100 adjusted during contacting would be too large.

FIGS. 4*a* to 4*d* show the cutting segment of the cutting unit 7 in relation to a specific blade 3 used in the process.

As shown in FIG. 4*a*, the cutting edge 3*a* penetrates for the first time in the axial direction 10 into the cross section of a first of the product openings 6*a*, 6*b*, here the product opening 6*b*, in a rotational position of the blade 3 in which a radial reference line 27—here the radial axis from the blade axis 3' to the beginning of the cutting edge 3*a*, at which this has the smallest distance to the blade axis 3'—is distanced by an entry angle α1 from the direction of immersion 25—the perpendicular to the upper edge 5*b* of the cutting frame 5 through the blade axis 3'.

With further rotation, the cutting edge 3*a* first reaches the lower edge 5*c* of the cutting frame 5 as shown in FIG. 4*b*, and a little later the cutting edge 3*a* emerges from the cross section of the first product opening 6*b* in the direction of rotation of the blade, although this sequence can also be reversed depending on the size ratios and design of the cross section of the product openings 6*a, b* and of the blade 3.

Figure 4D:
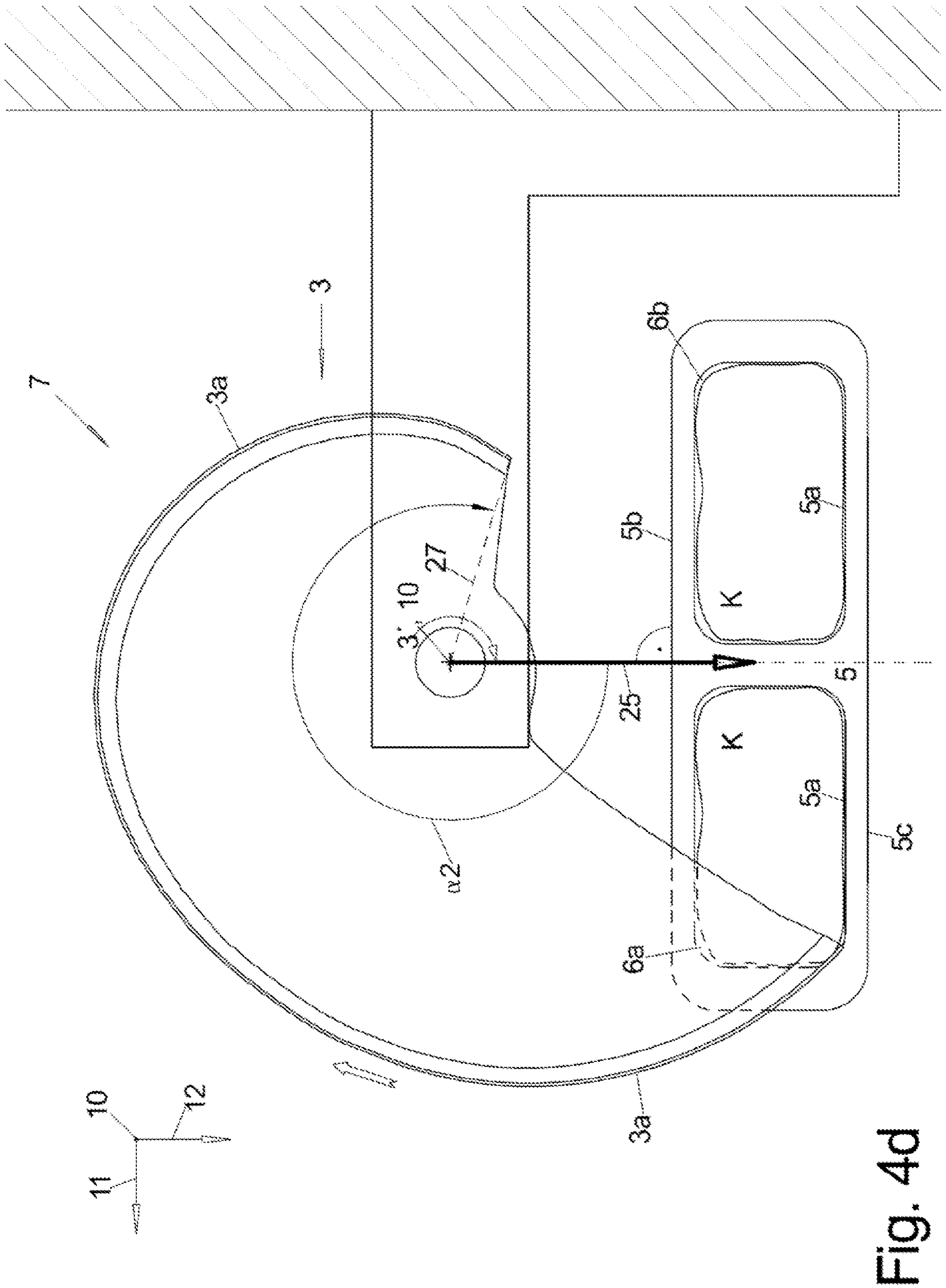

At least shortly before reaching the rotational position according to FIG. 4*c*, the circumferential edge of this product opening 6*b* acts as a counter edge 5*a* to the cutting edge 3*a*, as shown in FIG. 3*a* and FIG. 4*d*.

As shown in FIG. 4*d*, the cutting edge 3*a* then emerges from the cross section of the last product opening 6*a* in the direction of rotation of the blade 3 during further rotation at an exit angle α2, and again, before this rotational position is reached, the peripheral edge of this product opening 6*a* acts as a counter edge 5*a* to the cutting edge 3*a*.

The intermediate angle between α1 and α2 thus represents the cutting segment α2-α1.

With reference to the cutting segment α2-α1, the following statements can thus be derived with the blade 3 in contact, rotating, but axially stopped:

If, within one revolution of the blade 3, the no-load torque ML increases in each case even before the entry angle α1 is reached, the upper edge 5*b* of the cutting frame 5 is closer to the cutting plane 3" than the lower edge 5*c*, with an inclined position about the axis of inclination 26*a*.

If the no-load torque ML increases within the cutting segment α2-α1 already within the first half, in particular the first third, or only in the second half, in particular the third third, of the cutting segment α2-α1, there is an inclination of the front surface 5.1 about the second axis of inclination 26*b* and the right or the left end of the cutting frame 5 is contacted first by the blade 3.

If the no-load torque ML increases approximately in the middle of the cutting segment α2-α1, there is again an inclination of the front surface 5.1 about the first axis of inclination 26*a*, but then the lower edge 5*c* is closer to the cutting plane 3" than the upper edge 5*b*.

These automatically determinable statements can be given to the operator for the readjustment of the cutting frame 5 by the control 1*, e.g., via the display of the control 1*.

Of course, the front surface 5.1 can also be inclined about an axis of inclination running obliquely to the two transverse directions 11 and 12. Then several of the above statements apply cumulatively.

FIGS. 4*a* to 4*d* further show that—viewed in the axial direction 10—the contour of the circumferential edge of the blade is shaped and dimensioned in such a way and the axis of rotation 3' of the blade 3 to the cutting frame 5 is arranged in such a way, in particular at such a distance, to the cutting frame 5 that of a full 360° revolution of the blade 3 this is between ¼ and ⅓ of a full revolution without overlapping with the cutting frame 5.

Figure 5B:
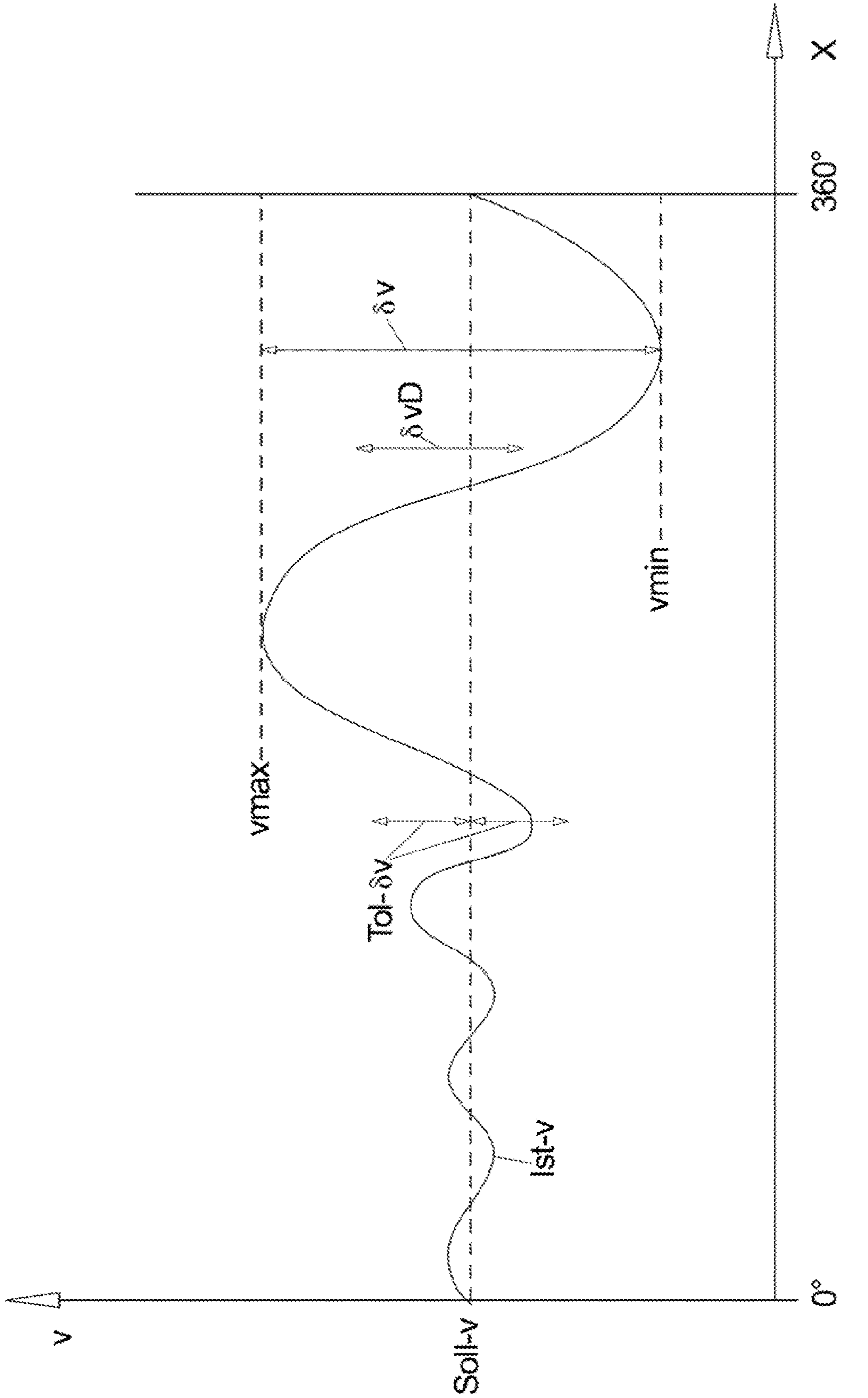
FIG. 5*b*: a speed diagram.

FIG. 5*b* shows the possible variation change δv of the rotation speed v of the idling blade 3 during a complete revolution, so that the actual rotational speed actual-v mostly oscillates around the desired rotational speed desired-v and the speed of the blade motor 22 is controlled in dependence thereon.

If the relative variation change δv are greater than a specified tolerance difference δvD, the current supply is increased during speed control if the rotation speed has dropped to an unacceptable extent, and reduced in the opposite case, in each case until the rotation speed is again within the permissible range.

If the absolute variation change from the set rotation speed set-v are greater than a specified tolerance deviation Tol-δv, the current supply is increased during speed control if the rotation speed has dropped to an impermissibly high level, and reduced in the opposite case until the rotation speed is within the permissible range again.

REFERENCE LIST

1 slicing machine, slicer
1* control
2 base frame
3 blade
3' blade axis
3" blade plane, cutting plane
3*a* cutting edge
4 feed conveyor, feed belt
4' pivot axis
5 cutting frame, cutting frame
5.1 front surface
5*a* counter edge
6, 6*a-d* product opening
7 cutting unit
8 upper product guide
8*a, b* idler pulley
9 bottom product guide
9*a, b* idler pulley
10 axial direction, feeding direction
10*a* approach direction
10*b* spacing direction
11 1. transverse direction (slicer width)
12 2. transverse direction (height-direction caliber)
13 gripper unit, gripper slide
14, 14*a-d* gripper
15 elevation
16 gripper claw
17 discharge unit
17*a, b, c* portioning belt, conveyor
18 gripper guide
19 height sensor
20 feed unit
21 end piece conveyor
22 blade motor
23 adjustment device
24 torque sensor
25 direction of immersion
26*a, b* axis of inclination
100 cutting gap
α1 entry angle
α2 exit angle
α2-α1 cutting segment
β difference angle K caliber, product caliber
MD1 1. moment difference
MD2 2. moment difference
MLmax maximum achieved no-load torque
MS moments threshold
ØML average no-load torque
S slice
V packing element
v rotation speed
δv variation change
δvD tolerance difference of the circulation speed
Tol-δv tolerance deviation of the circulation speed

The invention claimed is:

1. A method for automatically adjusting a cutting gap of a slicing machine for slicing strand-shaped product calibers from a food product into slices, under control by a controller of the slicing machine, wherein the slicing machine includes a blade motor for driving a blade about a blade axis, wherein the blade has a peripheral cutting edge which defines a blade plane, and a cutting frame with a counter edge for cooperation with the cutting edge, wherein, under control by the controller and without contact of the blade to the food product to be cut, the method comprises steps of:

a) moving the blade along the blade axis in an approach direction to approach the cutting frame until contact with the cutting frame, b) stopping the approach movement of the blade, c) moving the blade back in a spacing direction by a distance corresponding to a desired size of the cutting gap, measured in a direction of the blade axis, wherein, in the method, in or before step a), without contacting the food product to be cut, an idle torque of the blade motor or of the blade is measured and supplied to the controller, and in step b), the approach movement of the blade is stopped when an increase of the idle torque by at least a fixed 1st moment difference is detected and suppled to the controller, or when a defined absolute torque threshold value is detected and supplied to the controller, wherein in step a)

the method comprises automatically checking whether, within one revolution of the blade, the idle torque increases significantly even before an entry angle of the blade into the cutting frame is reached, if the idle torque increases significantly, a warning signal is emitted in order to check a parallel position of a front surface of the cutting frame to the blade plane, or an operator is informed that an upper edge of the cutting frame is closer to the blade plane than a lower edge.

2. The method according to claim 1, wherein a current supply to the blade motor in idle running is controlled in dependence on occurring changes of rotation speed of the blade during a complete blade revolution, and wherein the current supply to the blade motor is increased when a fixed tolerance difference between a lowest and a highest occurring rotation speed is exceeded during a complete blade rotation, in accordance with a determination that the rotation speed has dropped to an impermissibly high extent, and is reduced in an opposite case, in each case until the rotation speed is again within a permissible range.

3. The method according to claim 1, wherein the current supply to the blade motor in idle running is controlled as a function of occurring changes of actual rotation speed from a desired rotation speed during a complete blade revolution, and wherein the current supply to the blade motor is increased when a specified tolerance change is exceeded in accordance with a determination that the rotation speed has dropped to an impermissibly large extent, and is reduced in an opposite case, in each case until the rotation speed is again within a permissible range.

4. The method according to claim 1, wherein, in step b) after the stopping of the approach movement, several blade revolutions are carried out with unchanged current supply to the blade motor, the method further comprises checking whether, during the several blade revolutions, the idle torque does not drop by more than a defined 2nd moment difference, only when the idle torque does not drop by more than the defined 2nd moment difference, a reverse motion is started according to step c).

5. The method according to claim 4, wherein the several blade revolutions comprise at least 3 blade revolutions.

6. The method according to claim 4, wherein the several blade revolutions comprise at least 5 blade revolutions.

7. The method according to claim 4, wherein the several blade revolutions comprise at least 10 blade revolutions.

8. The method according to claim 1, wherein the approach movement in step a) is carried out at an approach rate of at most 0.1 mm per blade revolution.

9. The method according to claim 8, wherein the approach rate is at most 0.08 mm per blade revolution.

10. The method according to claim 8, wherein the approach rate is between 0.1 mm and 0.01 mm per blade revolution.

11. The method according to claim 1, wherein the automatic adjustment is performed after each movement of the cutting frame, and/or before cutting of each new caliber.

12. The method according to claim 1, wherein the method is carried out at a rotational speed of the blade of 50 rpm to 500 rpm.

13. The method according to claim 1, wherein the automatically checking whether, within one revolution of the blade, the idle torque increases significantly comprises checking whether the idle torque increases by more than a predetermined value.

14. A method for automatically adjusting a cutting gap of a slicing machine for slicing strand-shaped product calibers from a food product into slices, under control by a controller of the slicing machine, wherein the slicing machine includes a blade motor for driving a blade about a blade axis, wherein the blade has a peripheral cutting edge which defines a blade plane, and a cutting frame with a counter edge for cooperation with the cutting edge, wherein, under control by the controller and without contact of the blade to the food product to be cut, the method comprises steps of:

a) moving the blade along the blade axis in an approach direction to approach the cutting frame until contact with the cutting frame, b) stopping the approach movement of the blade, c) moving the blade back in a spacing direction by a distance corresponding to a desired size of the cutting gap, measured in a direction of the blade axis, wherein, in the method, in or before step a), without contacting the food product to be cut, an idle torque of the blade motor or of the blade is measured and supplied to the controller, and in step b), the approach movement of the blade is stopped when an increase of the idle torque by at least a fixed 1st moment difference is detected and suppled to the controller, or when a defined absolute torque threshold value is detected and supplied to the controller, wherein in step a)

the method comprises automatically checking whether, within one revolution of the blade, the idle torque increases significantly in an approximately central region of a cutting segment, if the idle torque increases significantly, a warning signal is emitted so that a parallel position of a front surface of the cutting frame to the blade plane is checked, or an operator is informed that a lower edge of the cutting frame is closer to the blade plane than an upper edge.

15. The method according to claim 14, wherein a current supply to the blade motor in idle running is controlled in dependence on occurring changes of rotation speed of the blade during a complete blade revolution, and wherein the current supply to the blade motor is increased when a fixed tolerance difference between a lowest and a highest occurring rotation speed is exceeded during a complete blade rotation, in accordance with a determination that the rotation speed has dropped to an impermissibly high extent, and is reduced in an opposite case, in each case until the rotation speed is again within a permissible range.

16. The method according to claim 14, wherein the current supply to the blade motor in idle running is controlled as a function of occurring changes of actual rotation speed from a desired rotation speed during a complete blade revolution, and wherein the current supply to the blade motor is increased when a specified tolerance change is exceeded, in accordance with a determination that the rotation speed has dropped to an impermissibly large extent, and is reduced in an opposite case, in each case until the rotation speed is again within a permissible range.

17. The method according to claim 14, wherein the automatically checking whether, within one revolution of the blade, the idle torque increases significantly comprises checking whether the idle torque increases by more than a predetermined value.

18. A method for automatically adjusting a cutting gap of a slicing machine for slicing strand-shaped product calibers from a food product into slices, under control by a controller of the slicing machine, wherein the slicing machine includes a blade motor for driving a blade about a blade axis, wherein the blade has a peripheral cutting edge which defines a blade plane, and a cutting frame with a counter edge for cooperation with the cutting edge, wherein, under control by the controller and without contact of the blade to the food product to be cut, the method comprises steps of:

a) moving the blade along the blade axis in an approach direction to approach the cutting frame until contact with the cutting frame, b) stopping the approach movement of the blade, c) moving the blade back in a spacing direction by a distance corresponding to a desired size of the cutting gap, measured in a direction of the blade axis, wherein, in the method, in or before step a), without contacting the food product to be cut, an idle torque of the blade motor or of the blade is measured and supplied to the controller, and in step b), the approach movement of the blade is stopped when an increase of the idle torque by at least a fixed 1st moment difference is detected and suppled to the controller, or when a defined absolute torque threshold value is detected and supplied to the controller, wherein in step a)

the method comprises automatically checking whether, within one revolution of the blade, the idle torque increases significantly within a 1st half of a cutting segment, if the idle torque increases significantly, a warning signal is emitted so that a parallel position of a front surface of the cutting frame to the blade plane is checked, or an operator is informed that there is an inclination of the front surface about an axis of inclination parallel to a direction of immersion.

19. The method according to claim 18, wherein a current supply to the blade motor in idle running is controlled in dependence on occurring changes of rotation speed of the blade during a complete blade revolution, and wherein the current supply to the blade motor is increased when a fixed tolerance difference between a lowest and a highest occurring rotation speed is exceeded during a complete blade rotation, in accordance with a determination that the rotation speed has dropped to an impermissibly high extent, and is reduced in an opposite case, in each case until the rotation speed is again within a permissible range.

20. The method according to claim 18, wherein the automatically checking whether, within one revolution of the blade, the idle torque increases significantly comprises checking whether the idle torque increases by more than a predetermined value.

* * * * *